United States Patent [19]

Jørgensen

[11] Patent Number: 5,758,604
[45] Date of Patent: Jun. 2, 1998

[54] TOY, PREFERABLY FOR ANIMALS

[75] Inventor: Kurt Lind Jørgensen, Vordingborg, Denmark

[73] Assignee: Jorgen Kruuse A/S, Marslev, Denmark

[21] Appl. No.: 765,586

[22] PCT Filed: Jun. 20, 1995

[86] PCT No.: PCT/DK95/00257

§ 371 Date: Jan. 31, 1997

§ 102(e) Date: Jan. 31, 1997

[87] PCT Pub. No.: WO95/35137

PCT Pub. Date: Dec. 28, 1995

[30] Foreign Application Priority Data

Jun. 21, 1994 [DK] Denmark .................. 0738/94

[51] Int. Cl.⁶ .................................. A01K 29/00
[52] U.S. Cl. .................................. 119/711
[58] Field of Search .................. 119/707, 709, 119/710, 711; 446/166, 168, 170

[56] References Cited

U.S. PATENT DOCUMENTS

| | | | |
|---|---|---|---|
| 2,752,725 | 7/1956 | Unsworth | 446/166 |
| 3,028,704 | 4/1962 | Rumbaugh | 446/168 |
| 3,648,403 | 3/1972 | Gommel | 446/168 X |
| 3,696,549 | 10/1972 | Zilius | 446/168 |
| 4,175,665 | 11/1979 | Dogliotti | 446/168 X |
| 4,595,369 | 6/1986 | Downs | 446/170 X |

*Primary Examiner*—Thomas Price
*Attorney, Agent, or Firm*—Merchant, Gould, Smith, Edell, Welter & Schmidt

[57] ABSTRACT

A toy, preferably for animals, is shaped as a hollow body with an inner labyrinth (9). An object such as a tidbit, may be caused to move along the labyrinth, in that e.g. a dog manipulates the hollow body. The hollow body is preferably shaped as a cube (3) with beveled edges, one side face of the cube being provided with an opening capable of receiving an insert member (2) and discharging the tidbit after it has passed through the labyrinth (9). Accordingly, a toy is provided, preferably for dogs, capable of meeting the natural needs of a dog with respect to the use of brain and olfactory sense.

11 Claims, 2 Drawing Sheets

TOY, PREFERABLY FOR ANIMALS

FIELD OF THE INVENTION

The invention concerns a toy, preferably for animals and of the type where an object, such as a titbit, may be moved in a hollow body with side faces that are formed by the inner wall of the hollow body, and where the hollow body has an entrance opening and an exit opening, where the entrance opening and the exit opening are formed by the same opening.

BACKGROUND OF THE INVENTION

British Patent Application 2 260 912 shows a toy which is shaped as a cube that has a labyrinth consisting of 81 cubic compartments. The cube has an entrance opening and an exit opening, with circular holes provided between the smaller cubic compartments so that a ball can move through the various small cubic compartments from the entrance to the exit by manipulation of the cube. As will be appreciated, the structure thus known will be difficult to use with anything but ball-shaped bodies, which, of course, limits the use of the toy.

U.S. patent application No. 666,022 discloses a toy, where an object may be moved inside a hollow body with side faces. The hollow body has an entrance and an exit opening that are formed by the same opening. The object is a small ball that can be moved along the side faces of the hollow body and a groove in a tubular member.

SUMMARY OF THE INVENTION

Accordingly, the object of the invention is to provide a toy of the above-mentioned type whose possible applications are considerably more versatile than known before. For example, it will be desirable to provide a toy - e.g. for a dog - which is so arranged as to meet the natural needs of the dog with respect to the use of brain and olfactory sense. The dog will hereby be more relaxed and behave in a balanced manner, because it can then expend its energy, which could otherwise not be brought into use.

The object of the invention is achieved by a toy of the type defined in the introductory portion of claim 1, which is characterized in that the hollow body has formed therein a path defined by the side faces of the hollow body and a further side face which is formed by a tubular member.

It is hereby ensured that objects which are not ball-shaped may be moved along the path. For example, a titbit for a dog may be used as an object, which has the advantage that in addition to using its brain the dog can also use its olfactory sense. The activity of the dog is hereby stimulated, because it recognizes the smell of titbits.

Further, it is considerably cheaper to manufacture such a toy, because it is not necessary to drill a plurality of holes in cubic compartments to provide the path, cf. the above-mentioned GB publication.

Expediently, the tubular member is insertable into the opening. As will be explained later, the use of a tubular insert member opens up the possibility of changing the "difficulty" of the toy.

Further, it is expedient that the upper wall portion of the insert member is formed with a hole which communicates with the path, and that the lower portion of the insert member is formed with a second hole which communicates with the path. The insert member is rotatable with respect to the hollow body, which provides the advantage that the "difficulty" of the toy may be adjusted, as the hole cooperates with a vertical wall which extends perpendicularly upwards from the path of the labyrinth.

The insert member is provided as a separate member which is insertable into the hollow body by snap locking, thereby ensuring that various insert members resulting in various "difficulties" of the body may be provided by e.g. making the holes in different sizes.

Expedient embodiments of the invention are expressed in the dependent claims.

BRIEF DESCRIPTION OF THE DRAWINGS

The invention will be explained more fully below with reference to the drawing, which shows an embodiment, and in which:

FIG. 2 shows the insert member with the upper hole and the connection to the path, while

DESCRIPTION OF THE PREFERRED EMBODIMENT

Figure 1:
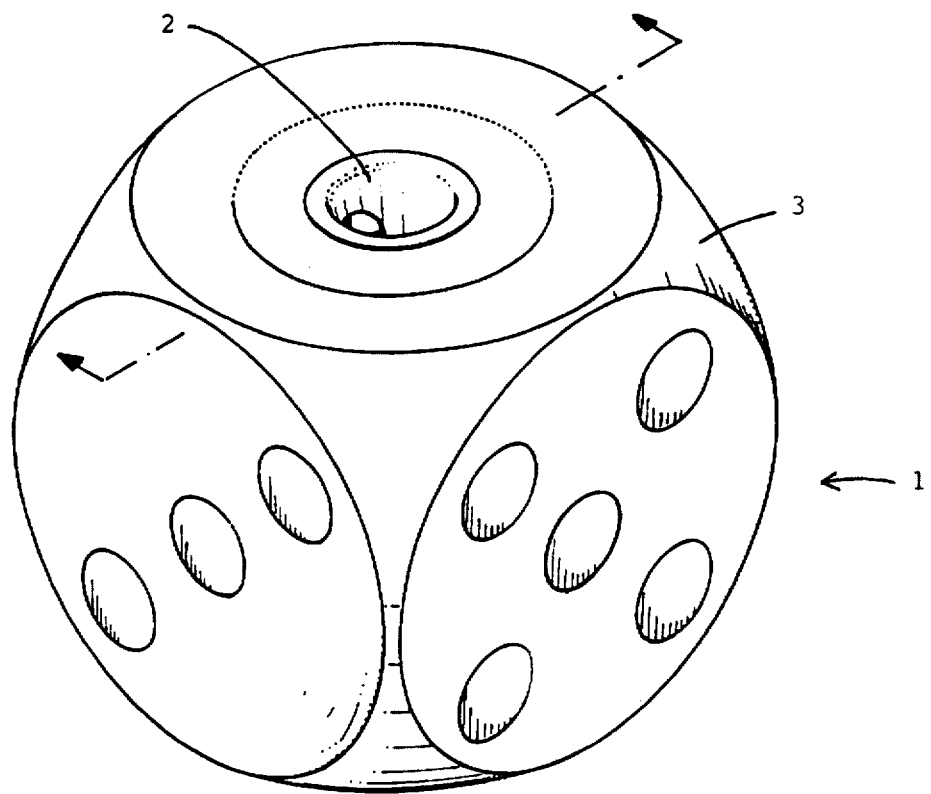
FIG. 1 shows the toy shaped as a cube with bevelled edges.

FIG. 1 shows the toy shaped as a cube with bevelled edges, one of the side faces of the cube being provided with an insert member.

Figure 2:
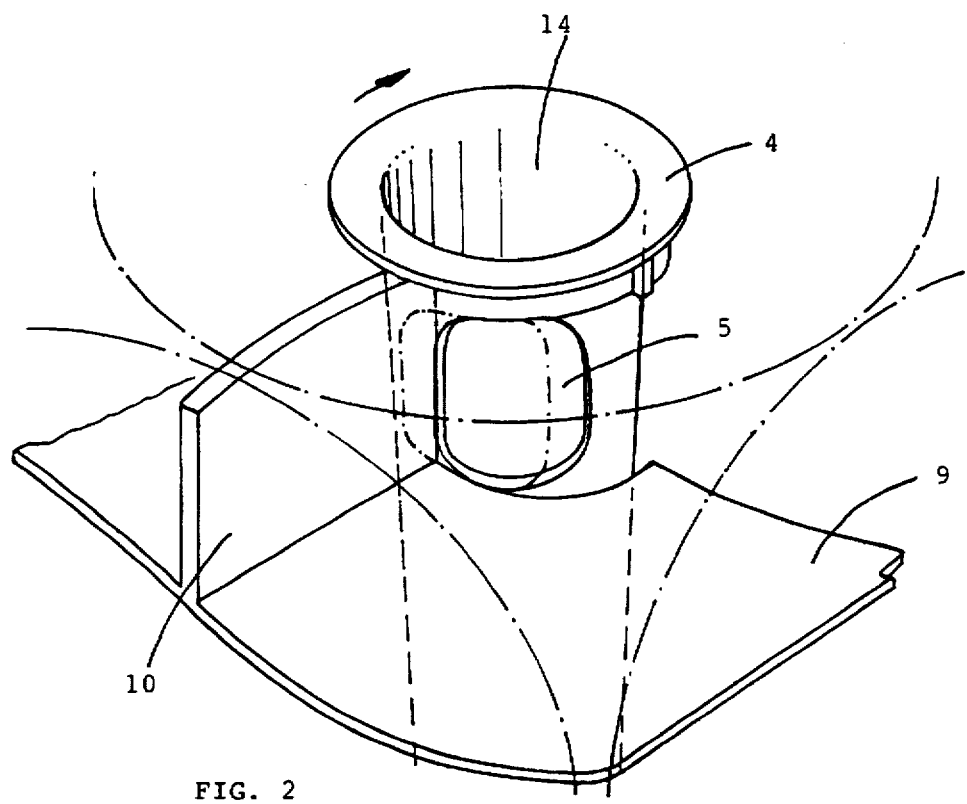

FIG. 2 shows how part of the path cooperates with the insert member. An upright barrier wall is provided on the path 9. It will be seen that opposite the upright barrier wall the insert member 2 is formed with a hole 5, whose extent may be limited by rotation of the insert member in the direction of the arrow.

Figure 3:
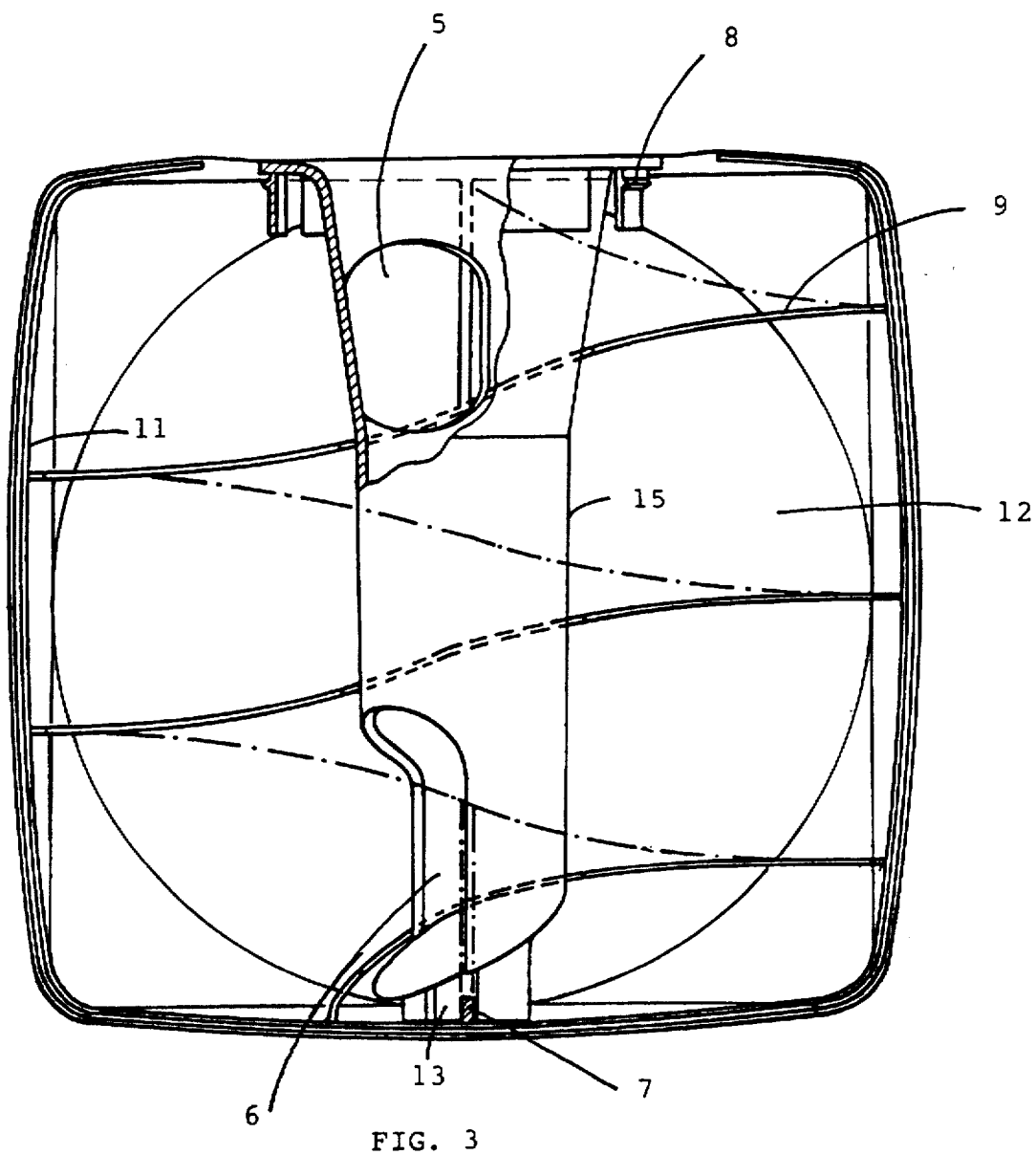
FIG. 3 shows, partly in section, how the path and the insert member are arranged inside the hollow body.

As will be seen in FIG. 3, the insert member has a lower hole 6 which, together with a bore 14 in the insert member, is intended for passing an object, such as titbit, down to the lower portion of the path in the hollow body. Further, the lower portion of the path has a recess which, together with a boss 7 on the bottom of the hollow body, is intended to limit the distance through which the insert member can be moved. As will be moreover seen in FIG. 3, the upper portion of the insert member is formed with snap locking means 8 capable of engaging the edge of the hollow body which defines the opening in the hollow body.

The mode of operation of the toy will be explained now. An object, such as a titbit for a dog, is moved down through the opening 14 in the insert member 2 to get placed on the path. The titbit can now be smelled by a dog, and the dog will of course try to get the titbit out of the path. This is done in that the dog manipulates the hollow body e.g. with the nose, thereby causing the hollow body to rotate, and the titbit will then follow the path and eventually end at the upper hole 5, from which it falls out of the opening 14 on the insert member. When the dog has tried this a couple of times, the "difficulty" of the toy may be increased, merely by rotating the insert member so that the titbit, when in the proximity of the hole, does not readily fall out.

Although the invention has been explained with reference to the drawing, it will be appreciated that other embodiments are conceivable. For example, the path may be formed as a tube or merely a U-shaped open channel which extends along the inner side of the hollow body. The insert member may hereby be omitted, but then it will not be possible to vary the "difficulty" of the toy.

I claim:

1. A toy for animals comprising: a hollow body having an interior space and an inner wall surface, and an opening defining both an entrance to and an exit from the hollow body whereby the interior space is in communication with an exterior of the hollow body; and a path formed in the hollow body, said path being defined by the inner wall surface of the hollow body and a further side face which is formed by a tubular member, said tubular member having an aperture in communication with said opening, said aperture being adjacent an interior wall surface of the hollow body so that an object may enter through the opening, pass through a portion of the tubular member, follow said path and exit through said aperture in response to manipulation of said hollow body member.

2. A toy for animals, comprising:

- a hollow body having an inner wall, and an opening defining both an entrance to, and an exit from, the hollow body;
- a tubular member removably inserted in said opening, the tubular member including a side face; and
- a path formed in the hollow body, said path being defined by the inner wall of the hollow body and the side face of the tubular member.

3. A toy according to claim 2, wherein the tubular member includes a hole in the side face thereof adjacent the opening, said hole in communication with the path.

4. A toy according to claim 3, wherein the tubular member includes a second hole in the side face thereof which communicates with the path, said second hole being located at an end of said tubular member distant from the opening.

5. A toy according to claim 4, wherein the tubular member has a through passage which communicates with the path via the second hole.

6. A toy according to claim 3 further including a barrier wall adjacent said hole, said barrier wall terminating the path.

7. A toy according to claim 2, wherein the tubular member is rotatable with respect to the hollow body.

8. A toy according to claim 2, wherein the tubular member is removably connected to the hollow body by snap locking means.

9. A toy according to claim 2, wherein the hollow body is shaped as a cube with bevelled corners.

10. A toy according to claim 2, wherein the path winds around the tubular member and is sloped.

11. A toy for animals, comprising:

- a hollow body having an interior space and an inner wall surface, and an opening defining both an entrance to, and an exit from, the hollow body;
- a first path extending into the interior space from an exterior of the hollow body;
- a second path within the interior space defined by a plurality of sloped walls projecting from the inner wall surface into the interior space, said second path leading to said opening and communicating with the exterior of the hollow body;
- wherein an object can be introduced into the interior space of said hollow body through said first path, and due to manipulation of said hollow body the object is able to move along said second path and exit from said hollow body through said opening.

* * * * *